(12) United States Patent
Coutant

(10) Patent No.: US 7,027,588 B2
(45) Date of Patent: Apr. 11, 2006

(54) TELEPHONE APPARATUS COMPRISING MONITORING MEANS

(75) Inventor: Francois Coutant, Mulsanne (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 201 days.

(21) Appl. No.: 10/196,096

(22) Filed: Jul. 16, 2002

(65) Prior Publication Data
US 2003/0021424 A1    Jan. 30, 2003

(30) Foreign Application Priority Data
Jul. 20, 2001    (FR) .................................. 01 09751

(51) Int. Cl.
*H04M 3/00*    (2006.01)
(52) U.S. Cl. .................................. 379/394; 379/355.01
(58) Field of Classification Search ............ 379/38–44, 379/114.17, 355.01, 209.01, 210.01; 455/404.1
See application file for complete search history.

(56) References Cited

U.S. PATENT DOCUMENTS 5,631,947 A * 5/1997 Wittstein et al. ....... 379/114.17
5,917,775 A * 6/1999 Salisbury .................... 367/93
6,006,102 A * 12/1999 Touzeau ..................... 455/517
6,028,514 A * 2/2000 Lemelson et al. ..... 340/539.13
2002/0183037 A1* 12/2002 Griffin et al. ............... 455/404

FOREIGN PATENT DOCUMENTS

| DE | 9106916.5 | 9/1991 |
| DE | 19532103 A | 3/1997 |
| DE | 20007647 | 9/2000 |
| DE | 20007647 U | 9/2000 |

OTHER PUBLICATIONS

Merriam-Webster's Collegiate Dictionary; 1997; p. 1211.*

* cited by examiner

*Primary Examiner*—Sinh Tran
*Assistant Examiner*—Walter F Briney, III
(74) *Attorney, Agent, or Firm*—Larry Liberchuk

(57) ABSTRACT

This apparatus (1) comprises monitoring means for an environment (2). These means are an integral part of a mobile telephone, for example. Thus, if an event occurs, a telephone communication takes place for another telephone apparatus (5). From the apparatus (5) it becomes possible to listen to what is occurring in the environment (2). According to one embodiment a communication is made periodically and, according to another mode, a communication is made as soon as an excessively intense noise occurs in this environment.

Application: monitoring of young children.

14 Claims, 2 Drawing Sheets

TELEPHONE APPARATUS COMPRISING MONITORING MEANS

The invention concerns a telephone apparatus comprising monitoring means, provided with control circuits.

The invention finds important applications in particular with regard to the monitoring of young children.

Such an apparatus is known from German document DE 200 07 647 U. This apparatus for monitoring young children is composed of a telephone apparatus to which equipment has been added for this monitoring.

The present invention proposes an apparatus of the type mentioned in the introduction which avoids the presence of this added equipment.

For this purpose, such an apparatus is characterized in that these monitoring means are an integral part of said electronic control circuits comprising a monitoring circuit.

According to a preferred embodiment of the invention, such an apparatus is remarkable in that it comprises means for avoiding the calls which are intended for it.

Thus, according to this embodiment, the child to be monitored is not disturbed by a call relating to the apparatus.

The invention will be further described with reference to examples of embodiment shown in the drawings to which, however, the invention is not restricted. In the drawings.

Figure 1:
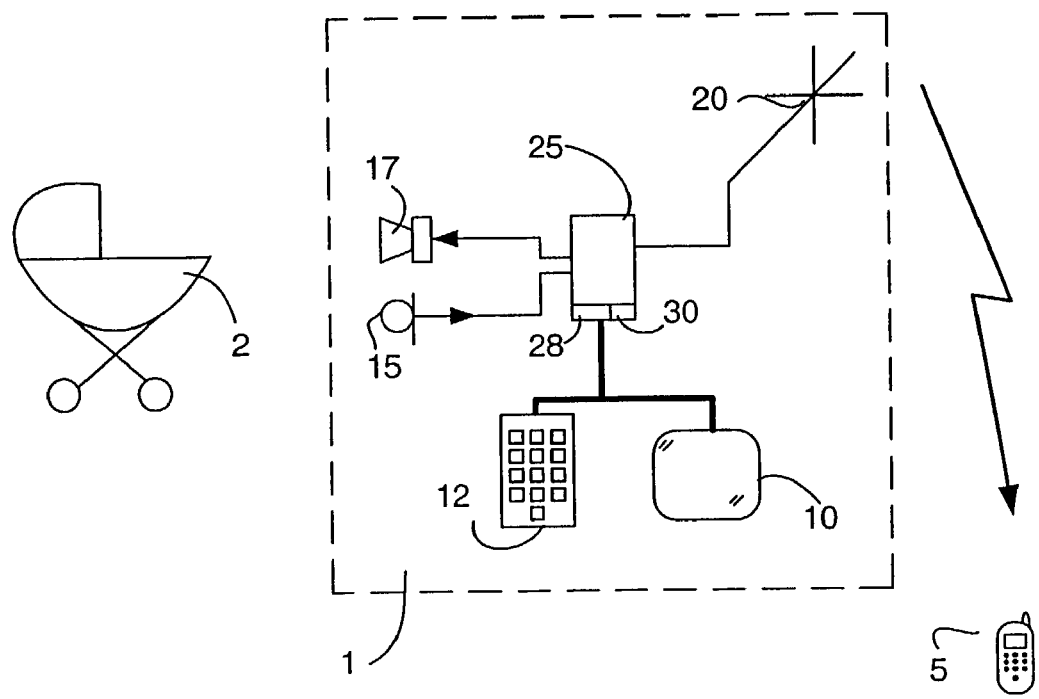
FIG. 1 shows an apparatus according to the invention, disposed close to a young child to be monitored.

In FIG. 1, the apparatus bears the reference 1. It is therefore placed close to a cradle 2 in which there is a young child that it is necessary to monitor. If the latter manifests any unrest by means of cries, this is detected by the apparatus 1, which transmits this to another apparatus 5, situated in an environment close to its parents, for example.

The apparatus 1 is a normal mobile telephone and comprises a screen 10, a keyboard 12, a microphone 15 and a loudspeaker/earpiece 17. An antenna 20 propagates the waves transmitted and receives them. All these components are connected to a telecommunication set 25. The operation of this set is under the control of the control circuits 28 cooperating with a memory 30.

Figure 2:
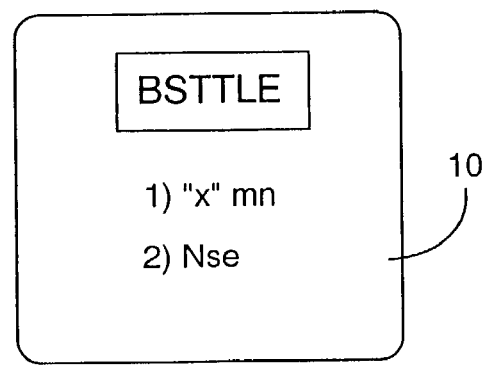
FIG. 2 shows the screen of the apparatus for configuring the monitoring control circuits.

According to one characteristic of the invention, several monitoring modes are available. These modes can be implemented by activating items shown on the screen 10. This is shown in FIG. 2.

Among the control memories, the one that relates to monitoring is shown, for example the menu referenced BSTTLE. Under this menu two items are displayed:

1) "x" mn
2) Nse.

Item 1, which can be activated by pressing the key bearing the FIG. 1 on the keypad 12, triggers automatic monitoring. That is to say every "x" minutes, a communication is established between the apparatus 1 and the apparatus 5. To establish this first mode the user needs to define the time "x" between two calls and also the call number of the second apparatus. It is also possible to define other numbers where the first is occupied or unavailable. The call number or numbers are recorded in a location of the memory 30.

Item 2 is activated in a similar fashion to the previous one, by pressing the key bearing the FIG. 2 on the keypad 12. In fact, the user merely has to enter the number or numbers of the apparatus to be called.

Figure 3:
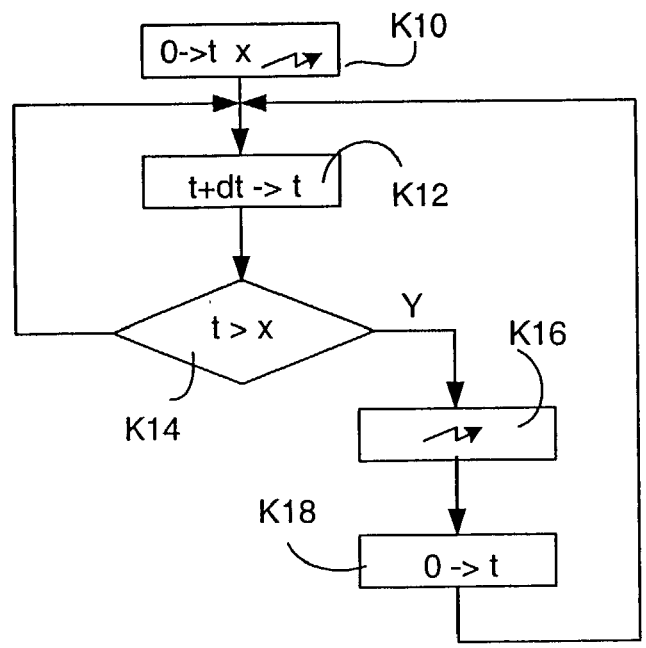
FIG. 3 shows a flow chart explaining a first mode of operation of the apparatus.

FIG. 3 illustrates, by means of a flow chart, the operation of the first mode. In this flow chart box K10 represents an initialization step. In this step a time counter "t" is initialized as well as the period "x" of the calls. The numbers to be called are also recorded in the memory location 30. Box K12 shows the incrementation of the time counter "t". The content of this counter is tested at box K14. If this content is less than "x", box K12 is returned to for an additional incrementation after a certain lapse of time. If the content of the counter "t" exceeds the value x, then the call is triggered at box K16 in order to connect the two apparatuses 1 and 5. Thus it is possible, from the apparatus 5, to listen to what is happening in the environment of the cradle 2, or even to communicate with the child. With the communication ended, box K18 is passed to, where the counter "t" is reinitialized before box K12 is passed to.

Figure 4:
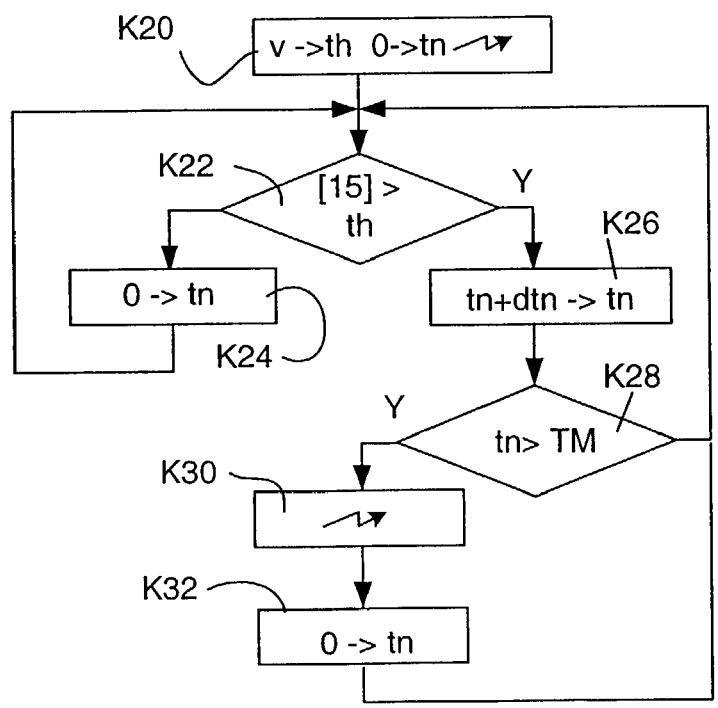
FIG. 4 shows a flow chart explaining a second mode of operation of the apparatus.

FIG. 4 illustrates, by means of a flow chart, the operation of the second mode. In this flow chart box K20 represents an initialization step. In this step a time counter "tn" is initialized as well as a threshold value for the microphone 15 for which it is considered that the child to be monitored manifests, through tears, a certain degree of unrest. In addition, a time value TM is entered. This value gives the period for a noise exceeding the threshold value to be considered to be a significant demonstration by the child. The numbers to be called are also recorded in the memory location 30. Box K22 shows the test on the level received by the microphone 15. If this is lower than the value th, the counter "tn" is set to zero, box K24. If this content exceeds this value, then the value of this counter tn is incremented (box K26). This value is then tested at box K28. If it is lower than the value TM, box K26 is passed to again for a new test of the output signal of the microphone 15. If the duration of the noise exceeding the value "th" has exceeded the value TM, then the apparatus 1 and 5 are connected, box K30. Once the connection is terminated box K22 is returned to after having reinitialized the counter "tn", box K32, for a new monitoring cycle.

To avoid the child to be monitored being disturbed or woken up by an incoming call, enabling one of the two operating modes prevents these incoming calls from making the audible call signals emitted by the loudspeaker 7 sound.

Although the description has been given in the context of the monitoring of a young child, the invention also finds applications in other monitoring fields, in particular where the noise manifested indicates an abnormality, in particular with the second mode. The first mode gives periodic monitoring for monitoring any process.

What is claimed is:

1. A mobile telephone apparatus capable of placing and receiving telephone calls, and including a microphone, comprising:

monitoring means, including control circuits, for monitoring sounds in an environment in which the mobile telephone apparatus is located, via the microphone;

wherein the control circuits allow a user to activate at least one monitoring mode of the mobile telephone apparatus;

wherein, when the at least one monitoring mode is activated, the control circuits call a telephone number of another telephone apparatus to establish a connection with the another telephone apparatus to allow listening to the monitored sounds in the environment via the another telephone apparatus, the call being established after a user-selectable criteria, said user-selectable criteria includes at least a predefined time; and wherein the monitoring means are an integral part of the mobile telephone apparatus.

2. A mobile telephone apparatus as claimed in claim 1, wherein: an incoming call deactivation option is provided in said control circuits.

3. A mobile telephone apparatus as claimed in claim 1, further comprising:

a sound sensor for sensing when a signal from monitoring the sounds in the environment exceeds a certain threshold;

wherein said control circuits establish a call to a telephone number of the another telephone apparatus when the sound sensor senses that the signal from monitoring the sounds in the environment exceeds the certain threshold; and the telephone number is contained in a memory associated with the control circuits.

4. A mobile telephone apparatus as claimed in claim 1, wherein:

the telephone number is contained in a memory associated with the control circuits; and the predefined times are defined by information contained in the memory associated with the control circuits.

5. A mobile telephone apparatus as claimed in claim 4, further comprising: a sound sensor for detecting noise in the monitored sounds in the environment;

wherein the monitoring means comprise a time counter for determining a significant duration of the noise detected by the sound sensor before said connection is established, said significant duration being settable by a user.

6. A mobile telephone apparatus as claimed in claim 1, further comprising: a sound sensor for detecting noise in the monitored sounds in the environment; wherein the monitoring means comprise a time counter for determining a significant duration of the noise in the monitored sounds in the environment as detected by the sound sensor before said connection is established, said significant duration being settable by a user.

7. A mobile telephone apparatus as claimed in claim 1, wherein: the mobile telephone apparatus comprises a cellular mobile telephone.

8. A mobile telephone apparatus as claimed in claim 1, wherein: the predefined times are defined by the user and include at least one of specific times of day and elapsed time since a previous call had been established.

9. A mobile telephone apparatus as claimed in claim 8, wherein:

the user defines the predefined times by defining a time between periodic calls to the another telephone apparatus.

10. A mobile telephone apparatus as claimed in claim 1, wherein: the user activates the at least one monitoring mode of the mobile telephone apparatus via a keypad of the mobile telephone apparatus.

11. A mobile telephone apparatus as claimed in claim 1, wherein:

the at least one monitoring mode comprises a plurality of monitoring modes; and the control circuits allow a user to activate a selected monitoring mode from among the plurality of monitoring modes.

12. A mobile telephone apparatus as claimed in claim 1, further comprising: at least one of a loudspeaker and an ear piece for allowing the user to use the another telephone apparatus to speak to a person in the environment when the connection is established.

13. A mobile telephone apparatus as claimed in claim 1, wherein:

the at least one monitoring mode comprises a plurality of monitoring modes; and the plurality of monitoring modes include a first mode wherein the control circuits call the telephone number of the another telephone apparatus periodically to allow listening to the monitored sounds in the environment via the another telephone apparatus periodically, and a second mode wherein the control circuits call the telephone number of the another telephone apparatus upon detecting, from the monitored sounds, a period of noise that exceeds a threshold value.

14. A mobile telephone apparatus capable of placing and receiving telephone calls, and including a microphone, comprising:

circuitry, integral with the mobile telephone apparatus, for monitoring sounds in an environment in which the mobile telephone apparatus is located, via the microphone; wherein:

the circuitry allows a user to activate at least one monitoring mode of the mobile telephone apparatus; and when the at least one monitoring mode is activated, the circuitry establishes a connection with another telephone apparatus by calling a telephone number of the another telephone apparatus to allow listening to the monitored sounds in the environment via the another telephone apparatus, the call being established after a user-selectable criteria, said user-selectable criteria includes at least a predefined time.

* * * * *